(12) United States Patent
Bauer

(10) Patent No.: US 6,669,424 B1
(45) Date of Patent: Dec. 30, 2003

(54) SCREWED CONNECTION, FASTENER FOR SAID CONNECTION AND METHOD FOR THE PRODUCTION THEREOF

(75) Inventor: Roland Bauer, Neuenstein (DE)

(73) Assignee: Baier & Michels GmbH & Co. KG., Frankfurt (DE)

( * ) Notice: Subject to any disclaimer, the term of this patent is extended or adjusted under 35 U.S.C. 154(b) by 0 days.

(21) Appl. No.: 09/959,705

(22) PCT Filed: May 4, 2000

(86) PCT No.: PCT/DE00/01398

§ 371 (c)(1), (2), (4) Date: Nov. 5, 2001

(87) PCT Pub. No.: WO00/68585

PCT Pub. Date: Nov. 16, 2000

(30) Foreign Application Priority Data

May 5, 1999 (DE) .......................................... 199 20 616

(51) Int. Cl.[7] .......................... F16B 37/08; B21D 53/24
(52) U.S. Cl. ....................... 411/433; 411/291; 411/310; 470/26
(58) Field of Search ................................ 411/171, 432, 411/433, 435, 290, 291, 310, 311; 470/25, 26

(56) References Cited

U.S. PATENT DOCUMENTS

| | | | | |
|---|---|---|---|---|
| 1,044,791 A | * | 11/1912 | Larava | 411/435 |
| 2,383,141 A | * | 8/1945 | Maage, Jr. | 411/435 |
| 3,079,969 A | | 3/1963 | Buckley | |
| 3,461,935 A | | 8/1969 | Monticelli | |
| 3,548,430 A | * | 12/1970 | Reinker | 470/26 |
| 3,576,205 A | * | 4/1971 | Reich | 411/171 X |
| 4,273,175 A | | 6/1981 | Capuano | |
| 4,674,931 A | | 6/1987 | Schwind et al. | |
| 4,797,045 A | * | 1/1989 | Lautenschlager, Jr. et al. | 411/533 |
| 5,785,477 A | | 7/1998 | McGuffey et al. | |

FOREIGN PATENT DOCUMENTS

| | | |
|---|---|---|
| DE | 8915011 | 3/1990 |
| DE | 3920 678 | 1/1991 |
| DE | 4437 798 | 4/1995 |

* cited by examiner

Primary Examiner—Neill Wilson
(74) Attorney, Agent, or Firm—Dykema Gossett PLLC

(57) ABSTRACT

A screwed connection has a first connecting means with an external thread and a second connecting means with an internal thread. In order to avoid self-slackening of the screwed connection, the external thread has a denticulation (14–16) which interacts with a mating denticulation of the internal thread.

5 Claims, 7 Drawing Sheets

Fig. 1a
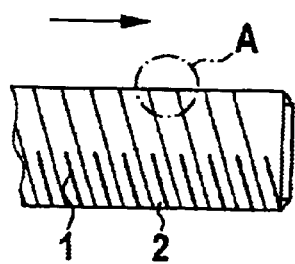
Fig. 1b
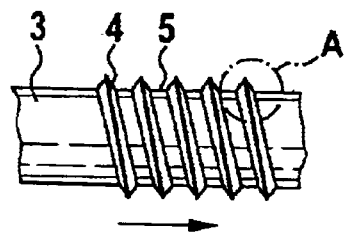
Fig. 2a
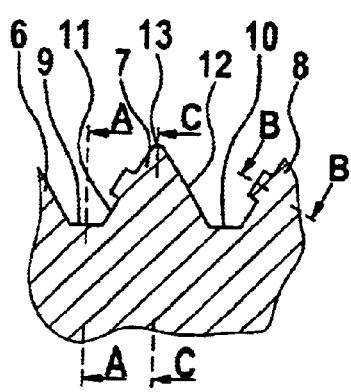
Fig. 2b
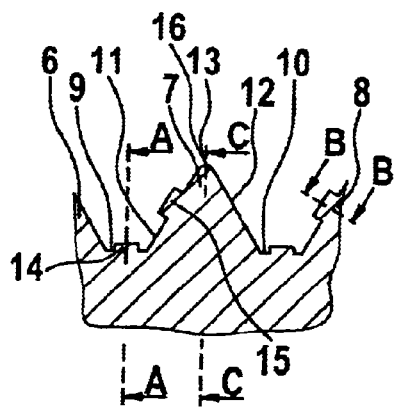
Fig. 3a  A-A
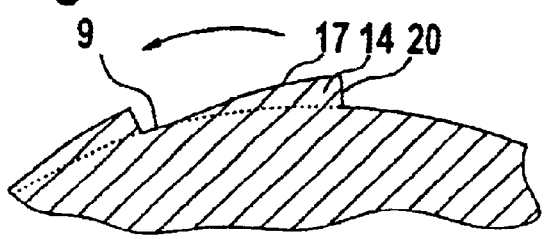
Fig. 3b  B-B
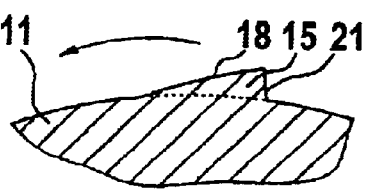
Fig. 3c  C-C
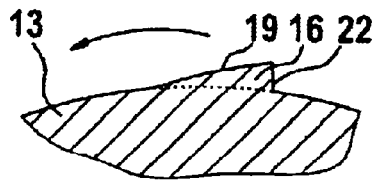

Fig. 6a A-A 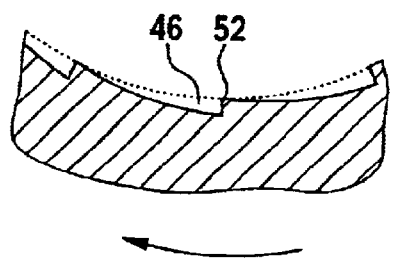
Fig. 6b B-B 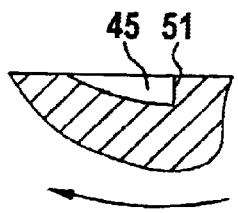
Fig. 6c C-C 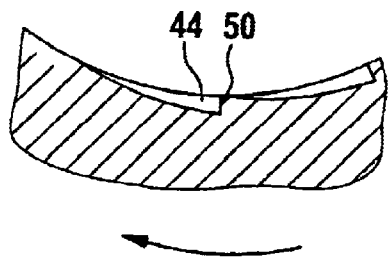

Fig. 9a  A-A
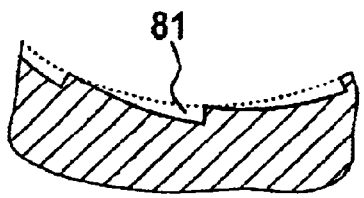
Fig. 9b  B-B
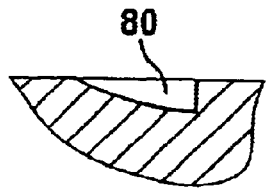
Fig. 10a
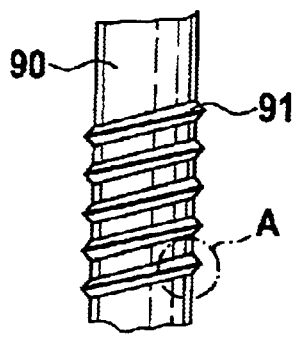
Fig. 10b
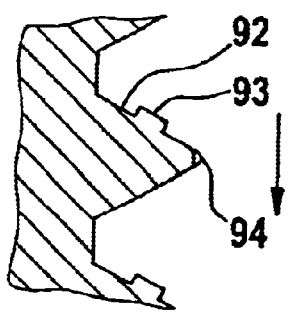
Fig. 11a
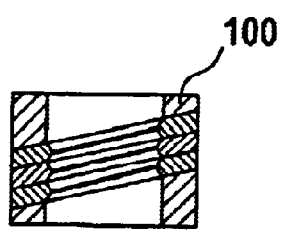
Fig. 11b
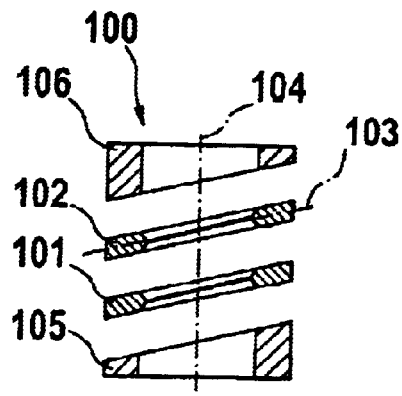

SCREWED CONNECTION, FASTENER FOR SAID CONNECTION AND METHOD FOR THE PRODUCTION THEREOF

TECHNICAL FIELD

The invention relates to a screwed connection, having a first connecting means with an external thread, which can generally also be designated as screw, and a second connecting means with an internal thread, in general usage also designated as nut. The individual parts of the screwed connection, namely the connecting means with external thread and the connecting means with internal thread, and a method of producing them are also the subject matter of the invention.

PRIOR ART

In conventional standard screws and standard nuts, the problem of locking the screwed connection to prevent unintentional slackening occurs. One possibility is to select the tightening moment to be so high that a friction grip between the external thread of the screw and the internal thread of the nut is effected. In particular with unsteady loads with high force alternations, as occur, for example, in motor vehicles on account of vibrations, this leads to a situation in which the forces which have to be absorbed by the screwed connection in order to ensure the friction grip are markedly higher than would be required by the actual retaining task.

Furthermore, in order to prevent turning of the screw in the nut, it is known to use "locking means" which, for example in the case of screw enamel, provide for adhesive bonding of the screw to the nut. A disadvantage here is that the locking means having an adhesive-bonding effect is destroyed after being slackened just once, since the adhesive connection has been broken. There is also the "clamping coating" according to DIN 267 Part 28. Here, there is the disadvantage that considerable effort is required during the fitting, and that, for example in the case of a galvanized surface, a chromated coating is damaged.

Finally, it is known to increase the friction by using profiled washers which have sharp edges, which, when the screwed connection is being tightened, at least partly dig into the screw material or into the material of the nut and the component arranged in between and thus produce a certain form grip in addition to the friction grip. Furthermore, it is known to provide screw heads or nuts with a corresponding profiled surface which interacts directly with the surface of the fastened component.

The subject matter of the present invention is a screwed connection which in the case of a screw is locked against slackening from the nut, the disadvantages described above being avoided.

DESCRIPTION OF THE INVENTION

According to the invention, the object is achieved by a screwed connection which has a first connecting means with an external thread and a second connecting means with an internal thread, the external thread having a denticulation which interacts with an internal denticulation of the internal thread.

On account of the denticulation arranged in the region of the thread, additional washers may be dispensed with and damage to the surface of the component to be connected is avoided. On account of the form grip produced by the denticulation inside the thread, that tightening moment of the screwed connection which has been required hitherto for producing an adequate friction grip can be markedly reduced, as a result of which the risk of the screwed connection fracturing is reduced and the overrating measured at the load is avoided. Furthermore, coatings or lubricants which have even penetrated into the thread can no longer lead to a substantial impairment in the functioning of the locking arrangement, since, instead of a friction grip, a form grip independent of friction is present.

Advantageous refinements of the screwed connection are described in the subclaims. In this case, it is advantageous if the denticulation is designed as a locking denticulation favoring one direction of rotation. The denticulation may be arranged on a tooth crest and/or in the groove root of the thread or on a tooth flank. For example, if the thread is not designed as a metric thread but as an Acme thread, for example in order to transmit movements over a large distance, this has the advantage that, in the case of large pitches, securing of the position by the thread itself is nonetheless possible. External locking devices may therefore be dispensed with. On account of the fine graduation of the denticulation in the thread, a virtually stepless adjustment is possible.

A further subject matter of the invention is a connecting means with an external thread, the external thread having a denticulation. This connecting means, for example as a screw, can interact with a conventional nut made of a softer, i.e. more elastic, material than that of the screw by the denticulation being impressed into the material of the soft nut. However, especially in this case, higher tightening moments are achieved than with mutual denticulation.

Furthermore, a connecting means with an internal thread is claimed, the internal thread likewise having a denticulation. In this case, too, when a soft screw is used, as in container construction for example, a denticulation in the nut may be sufficient in order to increase the security against unintentional slackening.

The connecting means described above are suitable for use in the abovementioned screwed connection. Further advantageous developments of the connecting means are described in the subclaims.

Finally, a plurality of connecting means having at most one thread turn are connected to form a stack, as a result of which, on the one hand, higher forces can be transmitted via the thread and, on the other hand, the locking function is improved.

A further subject matter of the invention is a connecting means with an internal thread which has at most one thread turn and which is part of a sheet-like material, the sheet-like material having material reinforcement in the region of the internal thread. In this way, it is possible to provide a larger part up to a complete thread turn in the sheet-like materials, the thickness of which is less than a complete pitch. Additional washers are then no longer necessary.

The subject matter of the invention is also a method of incorporating an internal thread in a sheet-like material. In this case, in a first step, the sheet-like material is pierced, the material displaced by the piercing being arranged laterally in the form of a turned-out portion. In a second step, the turned-out portion is made more uniform to form a collar, and, in a third step, a thread turn is embossed with the collar being deformed.

It is especially advantageous, in a fourth step, to stamp a denticulation in the thread turn. As a result, additional locking elements such as washers or adhesive bonding are superfluous.

Finally, a method of producing a connecting means with an internal thread is the subject matter of the invention, in which method, in a first step, openings are punched out of a sheet-like material, that, in a second step, the openings are provided with an internal thread, that, in a third step, the sheet-like material is bent over in such a way that at least two openings at least partly overlap, and that, in a fourth step, the folded sheet-like material is deformed in such a way the thread turns are arranged to form an internal thread, a denticulation being embossed in the internal thread before the third step.

Thanks to this method, it is possible, in a cost-effective manner, to produce a nut with an internal thread having a denticulation.

The sheet-like material advantageously has supporting collars at its ends, these supporting collars having been produced by bending over the sheet-metal strip, the connecting means which is adjacent to the connecting means carrying the supporting collars being supported on the supporting collar.

In order to facilitate the pressing operation, it is advantageous if the folded sheet-like material, before being compressed, has an axis which passes through the openings and is at an angle α to the subsequent center axis of the compressed sheet-like material.

In order to effect self-restraint of a screw in the connecting means, it may be of advantage if the sheet-like material is compressed only to such an extent that there is a distance between the end-side connecting means and the adjacent connecting means.

BRIEF DESCRIPTION OF THE DRAWING

Exemplary embodiments of the invention are shown in the drawing, in which:

FIG. 1a shows a connecting means with an external thread like a metric screw,

FIG. 1b shows a connecting means with an external thread designed as a sheet-metal screw, FIG. 2a shows a detail view from FIG. 1a in the region A of the external thread, FIG. 2b shows a detail view of the region A from FIG. 1b in the region of the external thread, FIG. 3a shows an enlargement along section line A—A in the groove root of the external thread from FIGS. 2a, 2b, FIG. 3b shows a section along section line B—B in the region of the tooth flank of the external thread from FIGS. 2a, 2b, FIG. 3c shows a section along section line C—C in the region of the tooth crest of the external thread from FIGS. 2a, 2b, FIG. 6a shows an enlargement along section line A—A in the groove root of the internal thread from FIG. 5, FIG. 6b shows a section along section line B—B in the region of the tooth flank of the internal thread from FIG. 5, FIG. 6c shows a section along section line C—C in the region of the tooth crest of the internal thread from FIG. 5, FIG. 9a shows a cross section along section line A—A in the region of the internal thread according to FIG. 8b, FIG. 9b shows a sectional representation along section line B—B from FIG. 8b, FIG. 10a shows a connecting means with an external thread in a design as a sheet-metal screw, in which case FIG. 10b shows the denticulation with respect to the screw-in direction, FIG. 11a shows a stack of connecting means with a thread turn and with compensating disks with or without a thread turn, FIG. 11b shows an exploded view of the stack from FIG. 11a with adjusting means arranged at an angle to the connecting axis, FIG. 15c shows a denticulation of the internal thread of a sheet-like material according to FIG. 15a.

EXEMPLARY EMBODIMENT OF THE INVENTION

Figure 4A:
FIG. 4a shows a connecting means with internal threads like a nut in side view.

A connecting means 1 with an external thread 2 is shown in FIG. 1a. The connecting means 1 can be screwed into a nut (not shown) in the arrow direction. The thread has a metric pitch. A connecting means 3 with an external thread 4 is shown in FIG. 1b, the external thread 4 being designed for a sheet-metal screwed connection and having a markedly wider groove root 5 than is the case in metric threads.

A partial view of the external thread of the metric screw shown in FIG. 1a is shown in FIG. 2a. In the sectional representation, the external thread has a succession of teeth 6, 7, 8, the teeth 6, 7, 8 in each case having a groove root 9, 10 and tooth flanks 11, 12. The teeth themselves each have a tooth crest 13.

FIG. 2b likewise reflects these facts, the section lines A—A, B—B, C—C, which in each case lead through locking projections 14, 15, 16, being depicted here.

The sections along section lines A—A, B—B, C—C are shown enlarged in FIGS. 3a to 3b. The locking projections 14, 15, 16 can be seen, which project beyond the radius indicated by a dotted line. There are locking projections 14 in the groove root 9, 10 in both FIG. 2a and FIG. 2b, although in FIG. 2a the locking projection fills the entire groove width, so that a straight section is shown in the sectional representation.

The projections 14, 15, 16 are designed in such a way that they favor one direction of rotation. This is achieved by there being a gently increasing flank in the direction of rotation, this flank being followed by a step formed by an abrupt reduction in diameter.

Figure 4B:
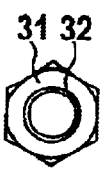
FIG. 4b shows the nut from 4a in plan view in a design as a hexagon nut with indicated internal thread.
Figure 4C:
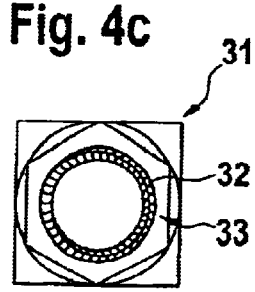
FIG. 4c shows various outer contours of a connecting means with an internal thread, the first thread turn being provided with a denticulation on both sides.

A connecting means with an internal thread 31 like a hexagon nut is shown in FIG. 4a. A plan view is shown in FIG. 4b, an internal thread 32 being indicated. Various outer contours of the connecting means 31 are shown in FIG. 4c, namely as a square, cylinder or hexagon. It can also be seen that the visible, topmost thread turn of the internal thread 32 has a denticulation 33. This denticulation is embossed in the thread flank.

Figure 5:
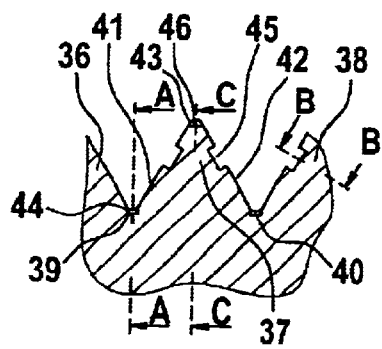
FIG. 5 shows a section through a connecting means with an internal thread.

The denticulation of the internal thread is shown in cross section in FIG. 5. Here, a succession of teeth 36, 37, 38 can again be seen, which in each case again have a groove root 39, 40 and tooth flanks 41, 42. Recesses 44, 45, 46 can be provided both in the groove root 39, 40 and in the tooth flanks 41, 42 and also on the tooth crest 43, these recesses 44, 45, 46 interacting with corresponding projections of the connecting means having an external thread. In nuts which originate from conventional nuts, there is a denticulation only on the respectively,outer tooth of the sectional representation since it is not readily possible to provide the denticulation on the inner thread turns.

The recesses are shown in detail in FIGS. 6a to c, the recesses 44, 45, 46 corresponding in their shape to the locking projections shown in FIGS. 3a to c. This means that, as viewed at the front in the direction of rotation, they have in turn a gently falling flank having a widening diameter, this flank coming to an end a shoulder 50, 51, 52, an abrupt reduction in the diameter taking place at the location of the shoulder 50, 51, 52. The arrows indicate the direction of rotation of the connecting means having an external thread, not the direction of rotation of the connecting means shown having an internal thread.

Figure 7A:
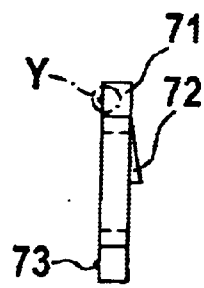
FIG. 7a shows a connecting means in disk form with one thread turn and a flat bearing surface.

Shown in FIG. 7a is a connecting means which has at most one complete thread turn of an internal thread. The connecting means 71 is designed as a disk, part of the internal thread 72 projecting beyond one side of the disk body. The other side, which faces the surface to be connected, has projections 73, which are explained later as detail feature Y.

Figure 7B:
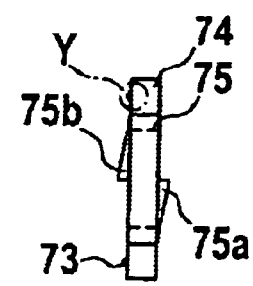
FIG. 7b shows a connecting means in disk form with a single thread turn and projections on both sides.

A connecting means with at most one complete thread turn is shown in FIG. 7b, the connecting means 74 again being designed as a disk and having projections 73. The internal thread 75 partly projects on both sides of the disk with the thread sections 75a, 75b, so that no smooth bearing surface is achieved.

Figure 7C:
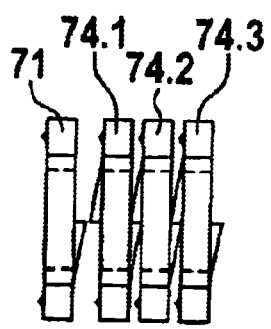
FIG. 7c shows a stack of connecting means according to 7a, 7b.

A stack of connecting means according to FIG. 7a and FIG. 7b is shown in FIG. 7c, connecting means 74.1 to 74.3 being put onto a connecting means 71 having a flat bearing side in such a way the thread sections are in each case joined together. The exploded drawing shown in FIG. 7c illustrates the construction of a nut formed by being compressed and having a plurality of thread turns. So that the nut can be used on both sides, a further connecting means 71 may be provided on the opposite side.

Figure 8A:
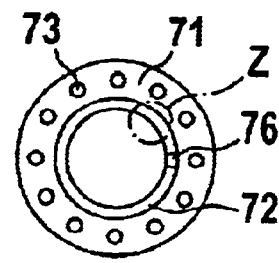
FIG. 8a shows a connecting means according to 7a, 7b in plan view.

The special advantage with a nut obtained in such a way consists in the fact that each individual thread turn can be provided with a denticulation, which is described below. A plan view of the connecting means 71 is shown in FIG. 8a, where the projections 73, which are arranged so as to be distributed over the periphery, can be seen. Arranged in the central region of the connecting means is a thread turn 72, which is interrupted at a point 76 in order to permit the step in the thread pitch.

Figure 8B:
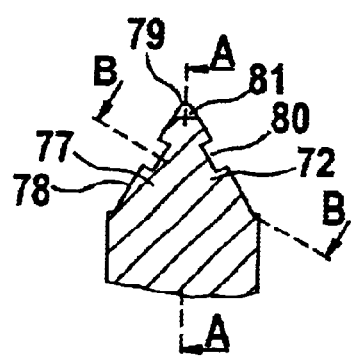
FIG. 8b shows a partial view in the region of the internal thread from FIG. 8a, FIG. 8c shows a detail view in the region of the bearing surface of the connecting means (detail Y)
Figure 8C:
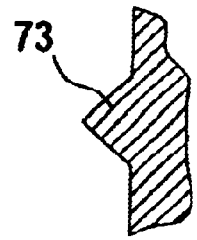

The detail Z from FIG. 8a is shown in FIG. 8b. This involves a cross section through the embossed thread turn 73, which is formed by a single tooth 77. This tooth has a flank 78 and a crest 79. Recesses 80, 81, which consist of a gentle flank and a stop, are arranged in the flank 78 and the crest 79, respectively. In this way, one direction of rotation is favored. The projection 73 from FIG. 8a is shown as detail Y in FIG. 8c, and FIGS. 9a and 9b show the denticulation 81 on the tooth crest and the denticulation 82 on the tooth flank, respectively.

The nut stack shown in FIG. 7c, which is composed of the individual, disk-shaped connecting means, has the advantage that the thread turns situated in the interior can also be provided with a denticulation, which in conventional nuts could only be effected in an extremely complicated manner. By means of the assembled nut stack, therefore, the retaining forces against unintentional slackening can be increased, additional thread turns permitting greater absorption of force of the screwed connection overall. It is essential in the case of the connecting means that in each case both tooth flanks are provided with recesses in order thus to be able to use them independently of position.

A connecting means 90 with an external thread 91 is shown in FIG. 10a, the external thread 91 being shown as detail A in FIG. 10b. In this case, projections 93 are provided on the tooth flanks 92 and are in each case arranged on the tooth flank turned rearward toward the screw-in direction. Projections which interact with corresponding recesses in the tooth root of the nut may likewise be arranged on the tooth crest 94.

The screw-in operation occurs in such a way that gently rising flanks of the connecting means with an external thread are directed past the shoulders of the connecting means with an internal thread, and, after the stop on the external thread has been directed past the shoulder of the internal thread, the projection of the external thread plunges into the recess of the internal thread. Elastic deformations constantly occur in the process; even slight plastic deformations are harmless.

The expenditure of force or the torque required for overcoming the interlocking lies below the hitherto used tightening moments, since the thread no longer needs to be held by friction grip. As a result, the screw may be dimensioned for the actual load case and does not have to absorb additional forces required for self-locking.

Figure 11C:
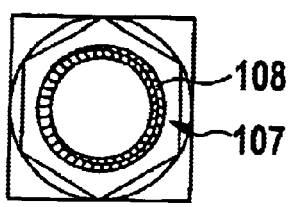
FIG. 11c shows a plan view of a stack from FIG. 11a, a denticulation of the internal thread being provided and various contours being shown.

Shown in FIG. 11a is a nut stack having a plurality of connecting means, which are shown in more detail in FIG. 11b. Shown in the center are two connecting means 101, 102 with in each case an internal thread turn, the center axis 103 of which lies at an angle to the center axis 104 of the nut stack 100. In order to nonetheless obtain a bearing surface perpendicular to the center axis 104, a compensating piece 105 which faces the surface to be fastened is provided. The compensating piece 105 may likewise be provided with an internal thread, but this is not absolutely necessary. So that the nut can be used on both sides, a further compensating piece 106 which is attached to that side of the connecting elements 101, 102 opposite the compensating piece 105 may be provided. As shown in FIG. 11c, the outer contour of the nut stack 100 may be designed as a square, hexagon or cylinder. The denticulation 107 on the internal thread 108 can again be seen.

Figure 12A:
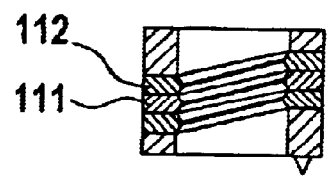
FIG. 12a shows a stack of a plurality of connecting means, the connecting means being pressed at an angle.
Figure 12B:
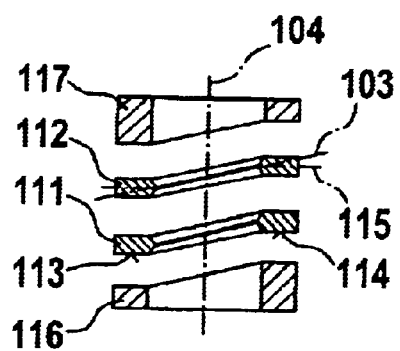
FIG. 12b shows the stack according to 12a in an exploded view.

The nut stack shown in FIGS. 12a, 12b differs from the nut stack shown in FIG. 11a owing to the fact that the connecting means 111, 112 have surface sections 113, 114 which are at least partly perpendicular to the connecting axis, and these surface sections 113, 114 are arranged parallel to a perpendicular 115 to the connecting axis 104 and are likewise perpendicular to the connecting axis 104. The thread turns themselves are arranged in accordance with the pitch along an axis 103 at an angle to the connecting axis 104. In order to provide a flat bearing surface, compensating pieces 116, 117 are again provided, which in turn may be provided with an internal thread. In this case, the denticulation may be present solely on the inner connecting means 111, 112, but may also be present on the top sides of the thread turns, accessible from outside, on the compensating disks 116, 117.

Figure 13A:
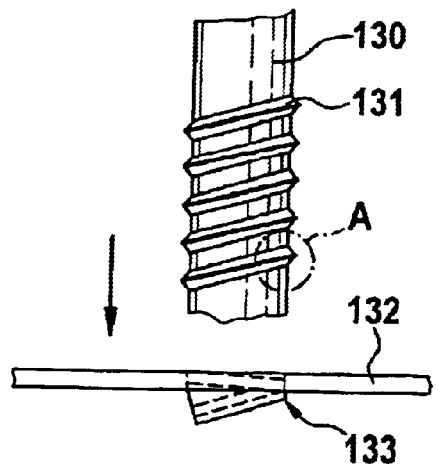
FIG. 13a shows a screwed connection, the connecting means with an internal thread being formed by a sheet-like material in the form of a metal sheet.
Figure 13B:
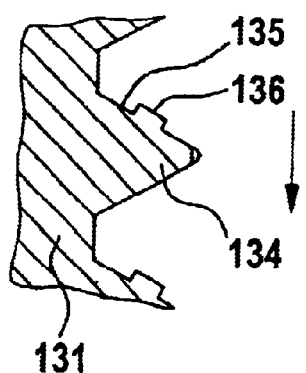
FIG. 13b shows the thread design of the external thread according to FIG. 13a, FIG. 13c shows the design of the internal thread of the sheet from FIG. 13a, FIGS. 14a to 14c show the production of a connecting means with an internal thread from a sheet-like material with a build-up of material being formed in the region of the screwed connection.
Figure 13C:
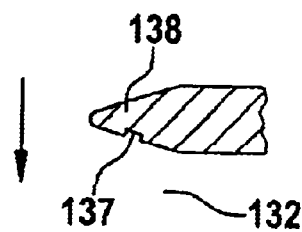

Shown in FIG. 13a is a screwed connection in which a connecting means 130 having an external thread 131 can be screwed into a sheet-like material 132. The sheet-like material 132 is provided with an internal thread 133 which has been produced by embossing the metal sheet. A detail of the external thread 131 is shown in FIG. 13b. A tooth 134 can be seen, on one tooth flank 135 of which a denticulation 136 is arranged. This denticulation is located on the tooth flank opposed to the screw-in direction. A recess 137, shown in FIG. 13c, on the internal thread 138 of the metal sheet 132 corresponds with this denticulation 136, so that interlocking of the projection 136 in the recess 137 is effected when the connecting means 130 (FIG. 13a) is screwed in. In this case, use may be made of the interlocking mechanisms mentioned above.

Figure 14A:
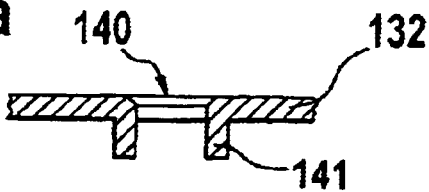
Figure 14B:
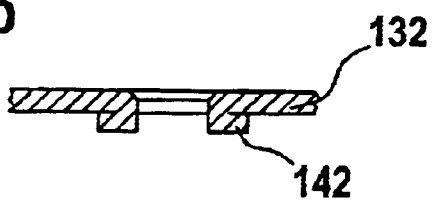
Figure 14C:
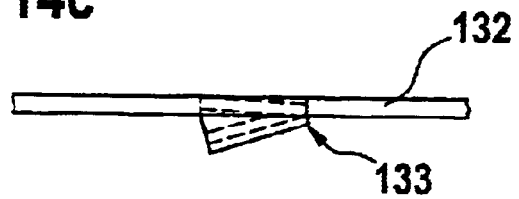

The preparation of a sheet-like material 132 up to the formation of the internal thread 133 is shown in FIGS. 14a to 14c. Starting from the production of an aperture 140 by spreading the sheet-like material from one side to the other with a turned-out portion 141 being formed, a build-up of material is produced, which is made more uniform in a second step to form a collar 142. Then, in an embossing operation, a thread turn with or without denticulation is embossed in the region of the collar 142. This makes it possible to provide thread turns with a pitch greater than the thickness of the metal sheet, as a result of which the introduction of force into the metal sheet is improved, and a friction grip via the thread or when a denticulation is provided also encourages a form grip.

Figure 15A:
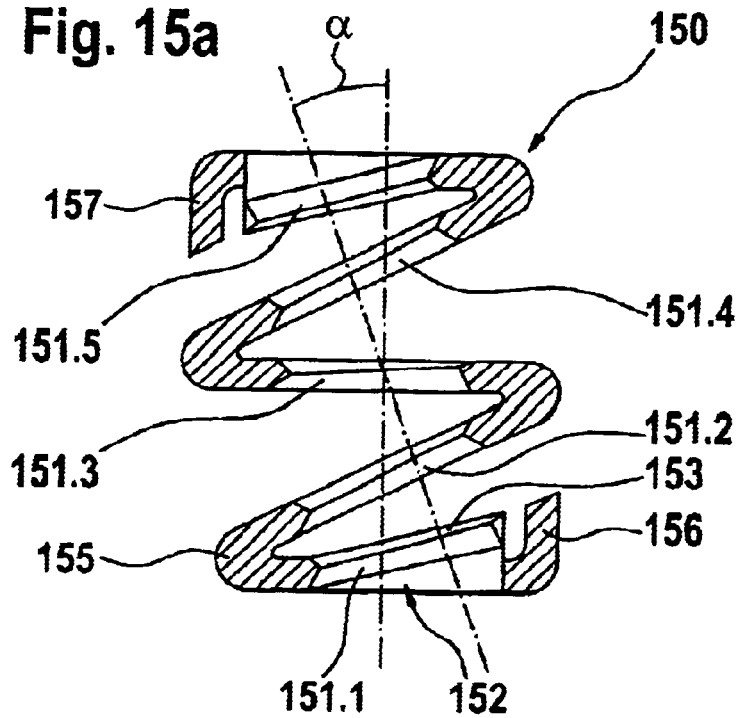
FIG. 15a shows a stack consisting of a plurality of connecting means connected to one another in an integral manner, this stack being produced from a sheet-metal strip by bending it over.
Figure 15B:
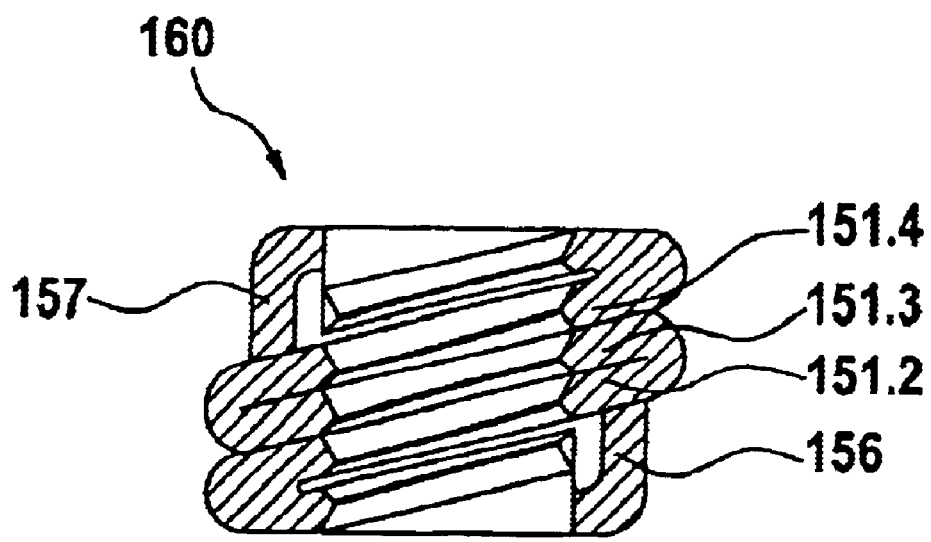
FIG. 15b shows the stack compressed to form a nut.
Figure 15C:
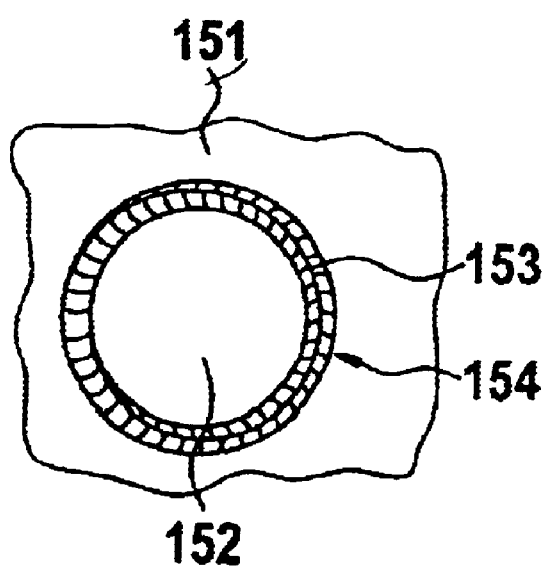

A nut which has been produced by folding a sheet-metal strip is shown in FIGS. 15a to 15c. Shown in FIG. 15a is a sheet-metal strip 150 which is folded in a zigzag shape and whose individual folds are designed as connecting means 151.1 to 151.5. To this end, the connecting means 151.1 to 151.5 have apertures 152, on the peripheral margin of which an internal thread 153 is formed. The internal thread 153 may be provided with a denticulation 154, shown in FIG. 15c.

The individual connecting means 151.1 to 151.5 are connected to one another in an integral manner via bends 155, a bend being arranged in each case between two adjacent connecting means. This bend is produced by bending over a sheet-metal strip, which was flat beforehand and in which openings 152 were punched out and in which a thread 153 was stamped. The flat sheet-metal strip was then folded in such a way that the outer sections 151.1 and 151.5 are parallel to one another and lie perpendicularly to the deformation of axis. As can be seen in FIG. 15a, this zigzag-shaped structure is not rotationally symmetrical, but has an angular offset. This angular offset by the angle $\alpha$ is less than 30°, advantageously less than 15°, and must be brought to 0° during the subsequent pressing operation.

Such a compressed stack 160 is shown in FIG. 15b. In the stack 160 shown, the inner connecting means 151.2 to 151.4 lie one on top of the other and are supported relative to the outer connecting means 151.1 and 151.5, respectively, via a supporting collar 156, 157. The supporting collar was shaped on the bent sheet-metal strip shown in FIG. 15a by bending up the ends of the sheet-metal strip. In this case, the height is dimensioned in such a way that the thread pitch described above is achieved overall, the pitch essentially corresponding to the thickness of the sheet-metal strip 150.

The stack shown in FIG. 15b consisting of a plurality of connecting means connected to one another in an integral manner has the advantage that each individual thread turn can be provided with a denticulation, the individual connecting means nonetheless being held together. An additional connection between the individual connecting means may therefore be dispensed with, but may nonetheless also be carried out for safety reasons.

In order to improve the connection between the individual connecting means, the first or last connecting means 151.1 or 151.5 may be arranged at a slight distance from the inner connecting means 151.2 or 151.4, respectively, although it has to be ensured that the screw to be inserted grips the internal thread. This may be done, for example, by a slight deformation being effected during the screwing-in, as a result of which the stack, as an entity, is put under prestress. With regard to the denticulation, all the configurations described above are possible. The special advantage over conventional nuts consists in the fact that the complicated machining of the internal thread in conventional nuts is replaced by simpler production techniques.

What is claimed is:

1. A method of incorporating an internal thread in a sheet-like material, comprising the steps of: piercing the sheet-like material such that the material displaced by the piercing is arranged laterally in the form of a turned-out portion making the turned-out portion more uniform to form a collar, embossing a thread turn with the collar being deformed, bending over the sheet-like material in such a way that at least two openings at least partly overlap, and deforming the folded sheet-like material in such a way that the thread turns are arranged to form an internal thread.

2. The method as claimed in claim 1, comprising the further step of stamping a denticulation in the thread turn.

3. The method as claimed in claim 1, wherein the sheet-like material has supporting collars at its ends, the supporting collars having been produced by bending over the sheet-metal strip, connecting means which is adjacent to connecting means carrying the supporting collars being supported on one of the supporting collars.

4. The method as claimed in claim 1, wherein the folded sheet-like material, before being deformed, has an axis which passes through the openings and lies at an angle $\alpha$ to a central axis of the deformed sheet-like material.

5. The method as claimed in claim 1, wherein the sheet-like material is deformed only to such an extent that there is a distance between an outer connecting means and an adjacent inner connecting means.

* * * * *